UNITED STATES PATENT OFFICE.

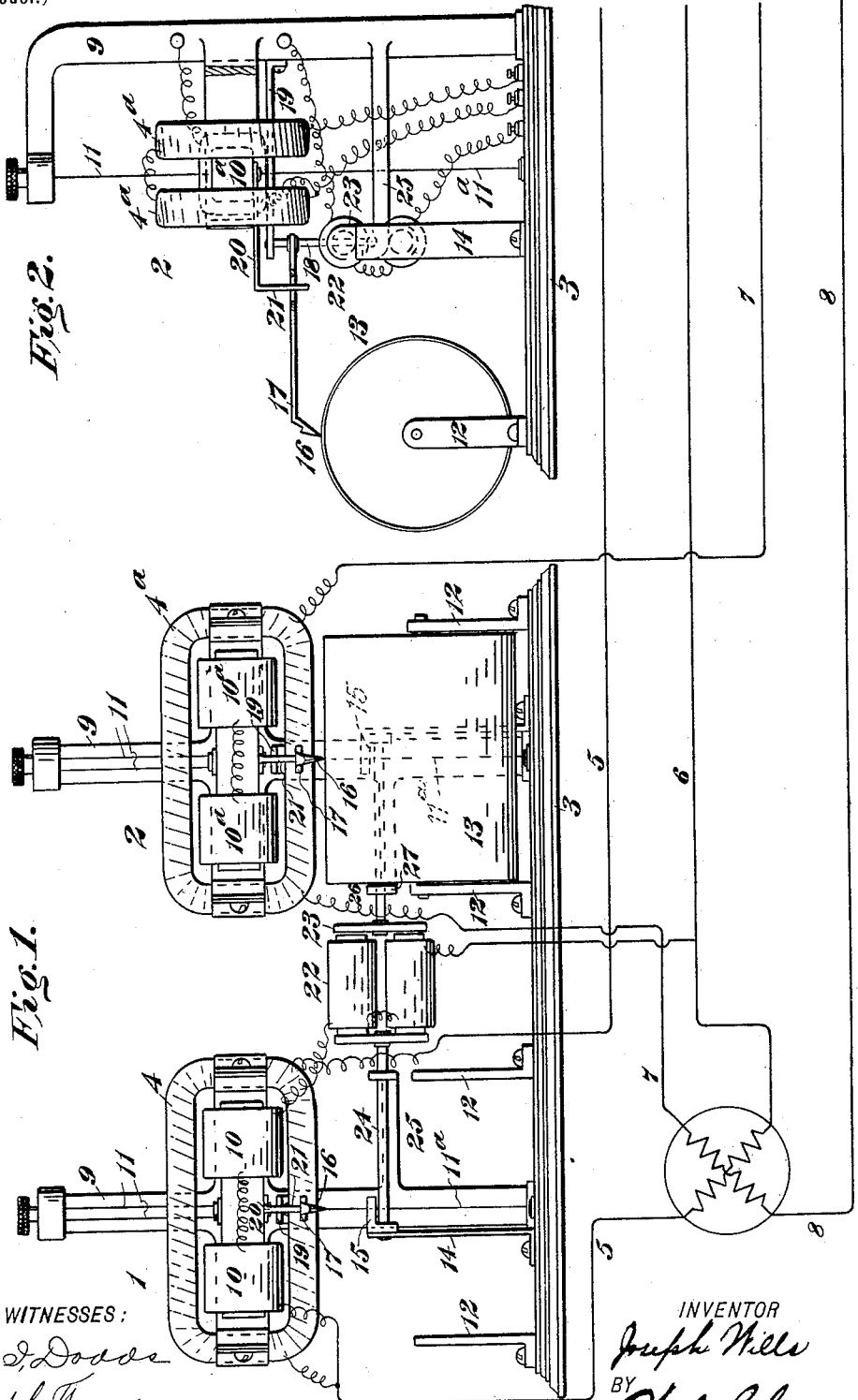

JOSEPH WILLS, OF NIAGARA FALLS, NEW YORK, ASSIGNOR OF ONE-HALF TO LEWIS B. STILLWELL, OF SAME PLACE.

ELECTRICAL MEASURING INSTRUMENT.

SPECIFICATION forming part of Letters Patent No. 626,848, dated June 13, 1899.

Application filed November 3, 1898. Serial No. 695,385. (No model.)

*To all whom it may concern:*

Be it known that I, JOSEPH WILLS, a citizen of the United States, residing at Niagara Falls, in the county of Niagara and State of New York, have invented a new and useful Improvement in Electrical Measuring Instruments, of which the following is a specification.

My invention relates to electrical measuring instruments, and particularly to such instruments of this general class as are constructed and operated to make a permanent record of the electrical energy supplied to translating devices.

The object of my invention is to provide a method and means whereby the friction between the recording-stylus and the paper upon which the record is made may be either eliminated or reduced to such small limits that the record will correspond to the actual energy transmitted over the circuit with which the instrument is connected.

It has been proposed prior to my invention to provide electrical measuring instruments with means for making a permanent record of the current or energy measured during the time that the instrument is in service, and such instruments have been put to practical use to some extent. Considerable difficulty has been experienced, however, by reason of the fact that the torque of the motor device constituting the actuating portion of the measuring instrument is usually so small that the efficiency is materially impaired by the friction between the coöperating elements of the recording device. There is also danger, as has been found in practice, that the recording-stylus will stick to the paper on which the record is made, and thus fail to even approximately record the energy.

In order to overcome the defects noted, I propose to employ an electromagnet energized by alternating or pulsating currents and so located with reference to the recording mechanism that the alternations or pulsations of the current passing through the coil or coils of the magnet will serve to impart mechanical vibrations to one or both of the recording members in such manner and to such a degree as to eliminate or materially reduce the friction between said parts, and thus insure a relative movement between them which corresponds to the actual energy being measured.

In the accompanying drawings, Figure 1 is a front elevation, partially diagrammatic, of two recording-wattmeters provided with my invention, one of the record-cylinders being removed in order to more clearly show the construction of the mechanism. Fig. 2 is a side elevation of one of the instruments shown in Fig. 1.

The mechanism as illustrated in the drawings will now be described, it being understood, however, that my invention is not limited to any particular type of record-making instrument or to any specific relation between the member or members of the recording mechanism and the vibration-producing device employed.

In the drawings, 1 and 2 are two instruments of the same construction arranged side by side on a single base 3 for the purpose of separately measuring the energy of two out-of-phase circuits. A single instrument employed for measuring the energy of a single-phase circuit is equally within my invention, as will be readily understood.

The stationary or current coils 4 of the instrument 1 are connected in series in circuit 5 6, and the corresponding coils $4^a$ of instrument 2 are connected in the same manner in circuit 7 8, these coils being supported by a suitable frame or standard 9. The movable or electromotive-force coils 10 of instrument 1 are supported by two wires 11, depending from the top of a standard 9, and by a steadying-wire $11^a$, extending to the base, and are connected across the circuit 5 6, the corresponding coils $10^a$ of instrument 2 being supported in the same manner and connected across the circuit 7 8. By reason of the character of the support for the shunt or electromotive-force coils 10 and $10^a$ they are free to turn on their respective axes, and the relation between them and the stationary series coils 4 and $4^a$ is such that the former will turn when both sets of coils are energized, the degree of axial movement of the shunt-coils being proportional to the energy in the circuit with which the instrument is connected.

Mounted in suitable bearings in standards 12 in front of each instrument is a drum 13, which is rotated by a suitable clock-train, preferably located inside the drum. This mechanism is not shown, since it may be of any known construction usually employed for such purposes. Back of each drum is located a standard 14, provided at its top with a suitable bracket 15. The stylus or marking-point 16 for making the record on suitably-ruled paper surrounding the drum 13 is located at one end of an arm 17, the other end of said arm being journaled on a vertical rod or pin 18. The lower end of the pin 18 is mounted in the bracket 15, and the upper end is supported by a suitable bracket or projection 19, connected to the standard or frame 9 of the instrument. A bar or plate 20 projects from the frame or core of the shunt-coils and has at its outer end a downwardly-projecting rod 21, that either extends through an opening in the stylus-arm 17 or is bifurcated to embrace it loosely, so that as the shunt-coils are axially deflected they will serve to move the stylus laterally to record the energy corresponding to such movement of the shunt-coils.

Between the two instruments are located an electromagnet 22 and its armature 23. As shown in the drawings, the magnet is mounted on one end of a rod 24, the other end being connected to standard 14 and bracket 15. The supporting-rod 24 is mounted adjacent to the magnet upon a suitable bearing in the outer end of a bracket 25, so as to permit of longitudinal movement of the same. The armature 23, which is located adjacent to the poles of the magnet, is supported in the same manner upon one end of a rod 26, the other end of which is fastened to the standard 14, this rod being also supported at another point upon a bracket 27 in such manner that it is free to move longitudinally except as such movement may be impeded by the standard 14, to which it is connected.

I have shown the coils of the electromagnet 22 as connected in series with the shunt-coils 10 of the instrument 1, but obviously they might be otherwise connected to either circuit the energy of which is to be measured or, in fact, to a separate alternating-current circuit. It is of course desirable to take the current for operating the magnet in some manner from the circuit the energy of which is to be measured, provided such circuit is supplied with alternating currents.

It will be understood from the foregoing description that as the current traversing the magnet is reversed the magnetism of its core will be reversed and the armature will be alternately attracted and repelled. Since these reversals are necessarily rapid, there will be a resulting small but rapid mechanical vibration. Inasmuch as the magnet and its armature are similarly connected to the respective standards and brackets, the vibration will be imparted to both the marking pens or styluses to a sufficient extent to overcome any objectionable friction between the same and the paper on which they rest.

It will be understood without further illustration that the vibration might be imparted to the support for the paper instead of to the support for the stylus, this being a mere reversal of the construction shown. It will also be understood that the magnet may be so arranged as to impart a vibratory movement of one of the members of the recording mechanism directly toward and away from the other member instead of laterally and, in fact, that the structure and arrangement may be modified in any manner desired, provided the arrangement is such that the alternations of the current are utilized to produce mechanical vibration of one or both of the principal members of the recording mechanism, so that friction between such members is eliminated or reduced to such limits that it does not impair the normal recording operation of the instrument.

I claim as my invention—

1. In an instrument for recording electrical energy, the combination with the record-making mechanism, of a coil traversed by alternating currents and acting magnetically to produce mechanical vibrations of one of the members of the recording mechanism.

2. In an instrument for recording the electrical energy of alternating currents, the combination with the record-making mechanism, of an electromagnet energized by alternating currents and effecting mechanical vibrations of one of the members of the recording mechanism which correspond to the alternations of the current.

3. In an instrument for recording the electrical energy of alternating currents, the combination with the recording mechanism, of an electromagnet energized by current from the source supplying the actuating-coils of the instrument and acting magnetically upon one of the members of the recording mechanism to produce mechanical vibration of said member.

4. In an instrument for recording the energy of alternating electric currents, the combination with the recording mechanism, of an electromagnetic means for effecting a mechanical vibration of one of the members of the recording mechanism which corresponds to the alternations of the current.

5. The method of eliminating or reducing the friction between the members of an electrical-energy-recording device which consists in imparting to one of said members a vibratory movement corresponding to the alternations of current the energy of which is recorded.

6. In an instrument for recording electrical energy, the combination with the record-making mechanism, of an electromagnet-coil traversed by pulsating currents, an armature within the magnetic field of said coil, and means for imparting mechanical vibrations to one of the members of the recording mechanism in accordance with changes in said magnetic field.

In testimony whereof I have hereunto subscribed my name this 19th day of October, 1898.

JOSEPH WILLS.

Witnesses:
HENRY A. SMITH,
GEORGE M. HARRINGTON.